US008769990B2

(12) United States Patent
Saito et al.

(10) Patent No.: US 8,769,990 B2
(45) Date of Patent: Jul. 8, 2014

(54) METHOD FOR TEMPERING GLASS SHEET, AND APPARATUS THEREFOR

(71) Applicant: Asahi Glass Company, Limited, Chiyoda-ku (JP)

(72) Inventors: Isao Saito, Chiyoda-ku (JP); Junji Hori, Chiyoda-ku (JP); Kiyota Miyazaki, Chiyoda-ku (JP); Tomohiro Suwa, Chiyoda-ku (JP); Yasumasa Kato, Chiyoda-ku (JP); Satoshi Yoshida, Chiyoda-ku (JP); Kazushige Yoda, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 13/628,105

(22) Filed: Sep. 27, 2012

(65) Prior Publication Data
US 2013/0019639 A1      Jan. 24, 2013

Related U.S. Application Data

(63) Continuation of application No. PCT/JP2011/058127, filed on Mar. 30, 2011.

(30) Foreign Application Priority Data

Mar. 30, 2010  (JP) ................................. 2010-079664

(51) Int. Cl.
C03B 27/012  (2006.01)
C03B 27/04  (2006.01)

(52) U.S. Cl.
CPC .......... *C03B 27/012* (2013.01); *C03B 27/0413* (2013.01)
USPC .......................................................... 65/114

(58) Field of Classification Search
CPC .................................................. C03B 27/012
USPC ........................................................ 65/114
See application file for complete search history.

(56) References Cited

U.S. PATENT DOCUMENTS 6,826,929 B2    12/2004  Boaz
7,096,692 B2 *  8/2006  Greenberg et al. ............ 65/60.2
(Continued)

FOREIGN PATENT DOCUMENTS

JP    2003-261344    9/2003
JP    2005-162517    6/2005
(Continued)

OTHER PUBLICATIONS

Corning, "Thermal Properties of Corning Glass", http://www.quartz.com/pxtherm.pdf, Accessed Mar. 25, 2013.*

(Continued)

*Primary Examiner* — Matthew Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

The method for tempering a glass sheet of the present invention comprises a heating step of heating the glass sheet to a temperature close to the softening point of the glass sheet, a quenching step of blowing a cooling medium to both surfaces in the thickness direction of the heated glass to cool it, and a pre-quenching step between the heating step and the quenching step and further has an internal heating substep of selectively heating the vicinity of the center portion in the thickness direction of the glass sheet at least in the quenching step, to create such a state that when the temperature at the center portion in the thickness direction of the glass sheet is close to the tempering point, the temperature at the surfaces in the thickness direction of the glass sheet is not higher than the annealing point.

9 Claims, 10 Drawing Sheets

(56) References Cited

U.S. PATENT DOCUMENTS

| | | |
|---|---|---|
| 7,367,205 B1 | 5/2008 | Boaz |
| 2003/0233846 A1* | 12/2003 | Boaz .............................. 65/114 |

FOREIGN PATENT DOCUMENTS

| | | |
|---|---|---|
| JP | 2006-500308 | 1/2006 |
| WO | 2004/026775 A2 | 4/2004 |
| WO | 2010/107293 A1 | 9/2010 |

OTHER PUBLICATIONS

International Search Report issued on Jun. 21, 2011 for PCT/JP2011/058127 filed on Mar. 30, 2011 with English Translation.

* cited by examiner

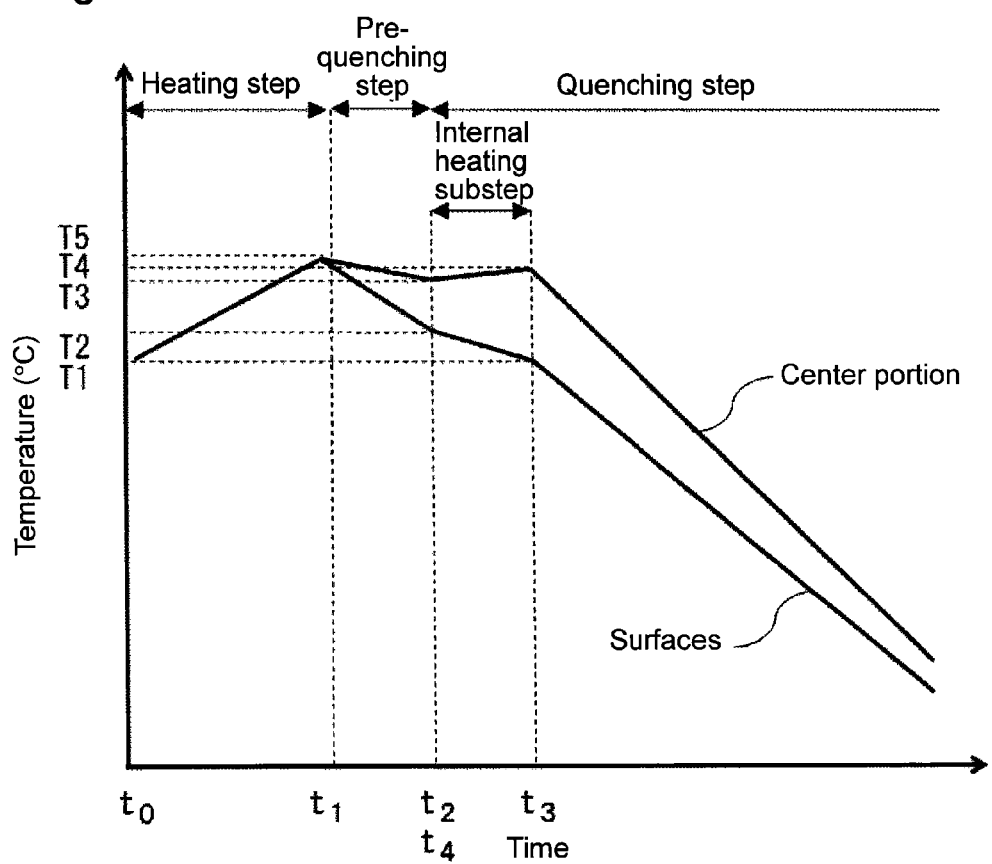

METHOD FOR TEMPERING GLASS SHEET, AND APPARATUS THEREFOR

This application is a continuation of PCT Application No. PCT/JP2011/058127, filed on Mar. 30, 2011, which is based upon and claims the benefit of priority from Japanese Patent Application No. 2010-079664 filed on Mar. 30, 2010. The contents of those applications are incorporated herein by reference in its entirety.

TECHNICAL FIELD

The present invention relates to a method for tempering a glass sheet, and an apparatus therefor.

BACKGROUND ART

Heretofore, it has been known to temper a glass sheet by heating the glass sheet to a temperature close to its softening point and rapidly quenching the surfaces of the glass sheet heated close to the softening point. A glass sheet can be made to have a larger compression stress imparted to its surfaces by increasing the temperature difference between the center portion in the thickness direction and the surfaces of the glass sheet. Therefore, it is effective to increase the temperature difference between the center portion and the surfaces of a glass sheet in order to temper the glass sheet or to control fragments (spline) when ruptured.

Here, as a means to increase the temperature difference between the center portion and the surfaces of a glass sheet, an invention described in Patent Document 1 discloses a method of heating a glass sheet by means of radio-frequency energy. Patent Document 1 discloses a method and apparatus for producing a tempered glass sheet, wherein a glass sheet is heated by means of radio-frequency energy formed by a feed electrode and a passive electrode provided in a pair so that the glass sheet is placed therebetween, and at the same time, the surfaces of the glass sheet are cooled to increase the temperature difference between the center portion and the surfaces of the glass sheet, followed by quenching to obtain a tempered glass sheet.

PRIOR ART DOCUMENT

Patent Document

Patent Document 1: JP-A-2006-500308

DISCLOSURE OF INVENTION

Technical Problem

In conventional tempering of a glass sheet, a glass sheet heated to a higher temperature was quenched by a high cooling power for tempering thereby to improve the physical properties such as the strength of the tempered glass sheet. However, if the temperature of the glass sheet is increased, the glass surface is likely to have scratches or distortion. Further, in order to increase the cooling power by using a gas such as air as a cooling medium, it is required to increase the pressure or air volume of the cooling medium, whereby there will be a problem such that the glass sheet is likely to broken by a tensile stress at the initial stage of the cooling, or the apparatus is required to be of a large scale. Further, a cooling apparatus wherein the pressure or air volume of the cooling medium is increased, is likely to have a problem such that a noise tends to be large.

The tempering method disclosed in the above-mentioned Patent Document 1 is a method wherein before quenching, the inside of the glass sheet is heated to increase the difference between the internal temperature and the surface temperature, followed by quenching for tempering, whereby tempering is carried out by increasing the temperature difference between the center portion and the surfaces of the glass sheet during the quenching. In the Patent Document 1, dielectric heating by radio-frequency energy (hereinafter referred to as "radio-frequency heating") is used as a method for selectively heating the inside of the glass sheet before quenching. Further, it is disclosed that the difference between the internal temperature and the surface temperature is further increased by cooling the surfaces while heating the inside of the glass sheet by radio-frequency heating.

However, the tempering method disclosed in Patent Document 1 requires a step of creating a difference between the internal temperature and the surface temperature of a glass sheet before quenching, and as compared with a tempering method comprising conventional heating step and quenching step, the apparatus tends to be complex.

Further, it is conceivable to increase the efficiency for radio-frequency heating by bringing electrodes to be closer to the glass sheet in order to heat the inside of the glass sheet by means of radio-frequency heating. However, if the electrodes for radio-frequency heating are brought to be too close to the glass sheet, electric discharge is likely to occur around the electrodes. That is, if a radio-frequency voltage is applied to the electrodes to carry out radio-frequency heating, since the glass sheet itself also has a potential, for example, in the mode in the Patent Document 1, electric discharge will occur with a point having a potential lower than the potential between the electrodes.

Therefore, in the system disclosed in the Patent Document 1, it is possible that at the time of heating the glass sheet by radio-frequency energy, electric discharge will occur, for example, between an electrode and a nozzle to blow air, or between an electrode and the glass sheet or a roll to convey the glass sheet. Once electric discharge occurs, it becomes impossible to carry out the radio-frequency heating, and accordingly, the upper limit for the radio-frequency voltage to be applied, is limited to a value not to cause electric discharge. As a result, there is a problem that it becomes difficult to secure the necessary heating ability.

The present invention is to provide a method for tempering a glass sheet, whereby a larger temperature difference can be created between the surface and the center portion of the glass sheet.

Further, in order to accomplish the above method, the present invention is to provide an apparatus for tempering a glass sheet, whereby heat generation from the inside of a glass sheet is utilized to effectively control the temperature to a desired level.

Solution to Problem

In order to solve the above problem, the present invention proposes the following constructions.

The method for tempering a glass sheet of the present invention is a method which comprises blowing a cooling medium to a glass sheet having a surface temperature of at most the softening point and at least the annealing point, for quenching to produce a tempered glass sheet, wherein at a stage before the temperature of the entire glass sheet becomes to be at most the strain point, quenching is carried out while selectively heating the vicinity of the center portion in the thickness direction of the glass sheet, against the surfaces.

In the above tempering method, the selective heating may be initiated within a period after the glass sheet in a temperature range of at most the softening point and at least a level close to but lower than the tempering point, is taken out from a heating furnace and before the blowing of the cooling medium is initiated, and the selective heating may be terminated after the initiation of the blowing of the cooling medium.

The above selective heating may be initiated at the same time as the initiation of the blowing of the cooling medium or thereafter.

Another method for tempering a glass sheet of the present invention comprises a heating step of preheating the glass sheet to a temperature close to the softening point of the glass sheet, a quenching step of blowing a cooling medium to both surfaces in the thickness direction of the heated glass sheet for quenching, a pre-quenching step between the heating step and the quenching step, and further an internal heating substep of selectively heating the vicinity of the center portion in the thickness direction of the glass sheet, against the surfaces, at least in the quenching step, wherein the timing for initiation of the internal heating substep is set to be within a period from an intermediate time point in the pre-quenching step to an intermediate time point in the quenching step, and the timing for termination of the internal heating substep is set to be at an intermediate time point in the quenching step, so as to create such a state that in the quenching step, when the temperature in the vicinity of the center portion in the thickness direction of the glass sheet is close to the tempering point, the temperature at the surfaces in the thickness direction of the glass sheet is not higher than the annealing point.

Further, in the internal heating substep, the temperature at the center portion in the thickness direction of the glass sheet and the temperature at the surfaces at the time of initiation of the internal heating substep may not necessarily be increased and may be maintained or decreased than the level at the time of the initiation.

When the temperature in the vicinity of the center portion in the thickness direction of the glass sheet is close to the tempering point, the difference between the temperature in the vicinity of the center portion in the thickness direction of the glass sheet and the temperature at the surfaces may be at least 100° C.

When the temperature in the vicinity of the center portion in the thickness direction of the glass sheet is close to the tempering point, the temperature at the surfaces in the thickness direction of the glass sheet may be at most the strain point minus 20° C.

In the internal heating substep, the temperature in the vicinity of the center portion in the thickness direction of the glass sheet at the time of initiation of the internal heating substep may be the highest temperature of the glass sheet in the internal heating substep.

Another method for tempering a glass sheet of the present invention comprises a heating step of preheating the glass sheet to a temperature close to the softening point of the glass sheet, a quenching step of blowing a cooling medium to both surfaces in the thickness direction of the heated glass sheet for quenching, a pre-quenching step between the heating step and the quenching step, and further an internal heating substep of selectively heating the vicinity of the center portion in the thickness direction of the glass sheet, against the surfaces, at least in the quenching step, wherein in or subsequent to the pre-quenching step, when the temperature at the center portion in the thickness direction of the glass sheet is designated as x° C., and the temperature at either one of both surfaces in the thickness direction of the glass sheet is designated as y° C., and when the temperature at the center portion in the thickness direction of the glass sheet is at least 620° C. and at most 700° C., x and y are in a relation to satisfy a primary expression of $y=ax+b$ (where a and b are constants), and the constant a in the primary expression is at least 0.5 and at most 0.65, and the constant b in the primary expression is at least 60 and at most 180.

The glass sheet may be made of soda lime silicate glass, and in the internal heating substep, radio-frequency radiation may be applied to the glass sheet to heat the glass sheet by radio-frequency heating.

The glass sheet may be a glass sheet containing metal ions, and in the internal heating substep, the glass sheet may be heated by means of short wavelength infrared light.

The apparatus for tempering a glass sheet of the present invention is an apparatus for tempering a glass sheet by cooling a heated glass sheet, which tempering apparatus comprises a quenching means to quench the glass sheet by blowing a cooling medium to both surfaces in the thickness direction of the glass sheet, an internal heating means to selectively heat the vicinity of the center portion in the thickness direction of the glass sheet being quenched, against the surfaces, and a conveying means to convey the glass sheet, wherein the quenching means comprises at least a nozzle unit having a plurality of nozzles with openings at their forward ends and disposed so that the openings are directed to said both surfaces, and a discharge means to let the cooling medium discharge from the openings of the nozzle unit, the internal heating means comprises at least an electrode unit to apply a radio-frequency voltage to the glass sheet to heat the glass sheet, and a power source to let the electrode unit apply the radio-frequency voltage, and the electrode unit, the nozzle unit and the conveying means are electrically insulated.

At least the nozzle unit may be formed of an insulator, and the conveying means may have a support member which supports the glass sheet by contacting at least a part of the surface of the glass sheet, and of which at least the part in contact with the glass sheet is made of an insulator.

Further, at least one opening among the plurality of openings of the nozzle unit may be disposed to be separated in the direction along the conveying direction from other openings among the plurality of openings, and when the plurality of openings are viewed from the conveying direction, adjacent openings may be disposed at positions not to overlap with each other.

Further, the electrode unit may have plural power feeding portions provided in a direction perpendicular to the conveying direction of the glass sheet, and an electrode wiring connected to the power source and connected to each of the power feeding portions, wherein the electrode wiring is formed so that the distances between the power source and the respective power feeding portions become substantially equal.

Further, the distance between a conductor disposed closest to the electrode unit and the electrode unit may be longer than the distance between the electrodes.

Advantageous Effects of Invention

By the process for tempering a glass sheet of the present invention, it is possible to create a larger temperature difference between the surfaces and the center portion of the glass sheet. Further, by the apparatus for tempering a glass sheet of the present invention, it is possible to heat a glass sheet to a desired temperature efficiently by utilizing heat generation from the inside of the glass sheet itself. Thus, by the present invention, it become possible to temper a glass sheet having a high thermal conductivity or a glass sheet having a thin thickness, which used to be difficult to attain heretofore.

BRIEF DESCRIPTION OF DRAWINGS

FIG. 7 is a process diagram for illustrating the method for tempering a glass sheet in this embodiment.

DESCRIPTION OF EMBODIMENTS

Figure 1:
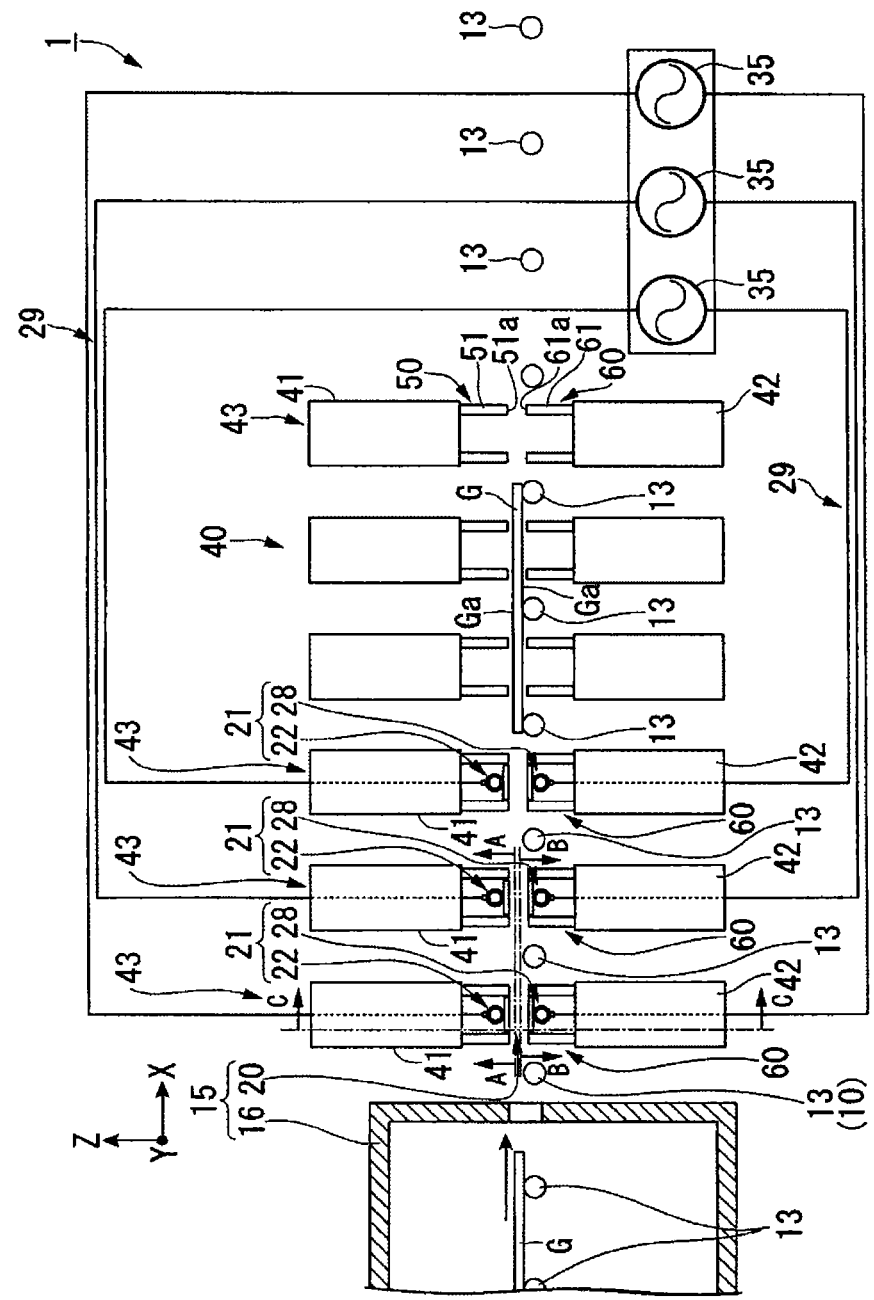
FIG. 1 is a vertical sectional view showing a cross-section along the direction for conveying a glass sheet by an apparatus for tempering the glass sheet in the first embodiment of the present invention.

In the present invention, heating is meant for heat generation in general which is caused by applying energy to an object (glass sheet) to be heated and includes heating by a heating furnace (pre-heating means) to preliminarily heat the entire glass sheet to a temperature close to the softening point, and heating by an internal-heating means in the pre-quenching step or in the quenching step. At the same time, the heating in the present invention is not necessarily limited to increase the temperature of the surface or inside of the object to be heated. For example, when energy is applied in a process of cooling the object to be heated, which has been heated to a certain temperature, it may include a case where the temperature increases and a case where the temperature decreases, depending upon the balance of the cooling capacity and the heat generation by the application of the energy. As a result, the temperature decrease of the object to be heated is suppressed, whereby the temperature may be maintained substantially at the same level, or the rate for the temperature decrease may become small, such being also included in the heating.

Further, in the present invention, the internal heating is meant for the above-described heating in general by heat generation of the object to be heated itself, and so long as it is heat generation from the object to be heated, the site of heat generation is not limited to its inside, and even heat generation from its surface is included in the internal heating.

Further, in the present invention, selectively heating the vicinity of the center portion in the thickness direction of the glass sheet, against the surfaces (hereinafter referred to also as internal heating) means to heat the vicinity of the center portion in the thickness direction partially and/or with high efficiency by e.g. an internal heating means such as radio-frequency or short wavelength infrared light so that the temperature in the vicinity of the center portion in the thickness direction becomes high, for the purpose of creating or increasing the temperature difference between the center portion in the thickness direction of the glass sheet and the surfaces of the glass sheet.

For example, when dielectric heating by radio-frequency heating is used, heat is generated by energy of electromagnetic waves with higher efficiency as the temperature becomes high. When a high temperature portion and a relatively low temperature portion thereto are present in a glass sheet, the high temperature portion undergoes heat generation more by such dielectric heating, whereby the temperature difference between the high temperature portion and the low temperature portion increases. Therefore, when a glass sheet, of which the vicinity of the center portion in the thickness direction (hereinafter sometimes referred to simply as the inside) has a high temperature relative to the surfaces, is subjected to dielectric heating, the temperature difference between the inside and the surfaces will increase.

Here, when a glass sheet, of which the inside and the surfaces are substantially in an equal state, is subjected to dielectric heating, the entire glass sheet is equally heated, whereby selective heating cannot be accomplished. Therefore, in the present invention, selectively heating the inside against the surfaces, means that a glass sheet in a state where the inside is at a temperature higher than the surfaces, is subjected to dielectric heating.

For example, in the case of safety glass for vehicles made of soda lime silicate glass and having a usual thickness (from 1 to 3.5 mm), the time for continuous quenching is usually from about 1 to 3 minutes. In such quenching, the time for continuing radio-frequency heating in the present invention is preferably from about 1 to 10 seconds, more preferably from 2 to 6 seconds, in consideration of the productivity of the apparatus, etc. In a case where the energy of radio-frequency heating is lower, the time may be longer.

Further, in the present invention, the vicinity of the center portion in the thickness direction of the glass sheet means a portion to be selectively heated. In a case where the temperatures of the two principal surfaces of a glass sheet during the cooling are equal, the geometrical center portion in the thickness direction has the highest temperature. In a case where the temperatures of the two principal surfaces are different, the highest temperature portion is a portion closer to the high temperature side surface than the geometrical center in the thickness direction. In the present invention, the vicinity of the center portion in the thickness direction is meant for the highest temperature portion in the thickness direction which may be different from the geometrical center in the thickness direction, as mentioned above.

Further, in the present invention, quenching means rapid cooling by blowing a cooling medium to the surfaces of a glass sheet in order to temper the glass sheet preliminarily heated to a desired temperature, at a cooling rate higher than at least natural cooling. Specifically, it means to remove heat rapidly from the surfaces of a glass sheet as an object to be cooled, by using an active cooling means such as air cooling by a blower or high pressure gas, liquid cooling, mist cooling or contact type cooling, against the surfaces of the heated glass sheet. With respect to the cooling capacity required for tempering a glass sheet, in the case of a glass sheet made of soda lime silicate glass and having a usual thickness (from 1 to 3.5 mm), a cooling means having a cooling capacity of from 300 to 500 kcal/m$^2$/hr/° C. is usually used. As the thickness of the glass sheet becomes thinner, a higher cooling capacity is required. Further, in the case of tempering a glass sheet having a thinner thickness or a glass sheet made of glass having a high thermal conductivity, a still higher cooling capacity may be required.

On the other hand, in this specification, cooling of a glass sheet at a cooling rate lower than quenching is referred to as natural cooling. For example, it is meant for a phenomenon such that when a high temperature glass sheet is placed in an atmosphere having a temperature lower than the temperature of the glass sheet, the temperature of the glass sheet gradually decreases. Specifically, it is meant, for example, for an unavoidable passive temperature decrease such as a temperature decrease when a glass sheet is transported or left to stand by on a conveying apparatus having no heating means. Further, in the present invention, natural cooling also means cooling at a cooling rate lower than quenching, by means of an active means such as blowing a cooling medium to the glass sheet surface in the same manner as in the above mentioned quenching. In a case where natural cooling is carried out by an active means, the glass sheet is cooled with a lower cooling capacity as compared with the above quenching.

Further, in the present invention, cooling includes a known cooling method or means in a conventional method for tempering a glass sheet, including the above-described quenching and natural cooling.

Further, the quenching means in the present invention is capable of removing heat of an object to be cooled, rapidly at a rate higher than natural cooling as mentioned above. Further, the quenching means can be used as a cooling means to carry out usual cooling or annealing for removing heat more slowly than quenching, by adjusting its cooling capacity to be small, and cooling by means of a quenching means may include a case where it is not quenching.

Now, details of an apparatus 1 for tempering a glass sheet and a method for tempering a glass sheet in one embodiment of the present invention will be described.

Figure 2:
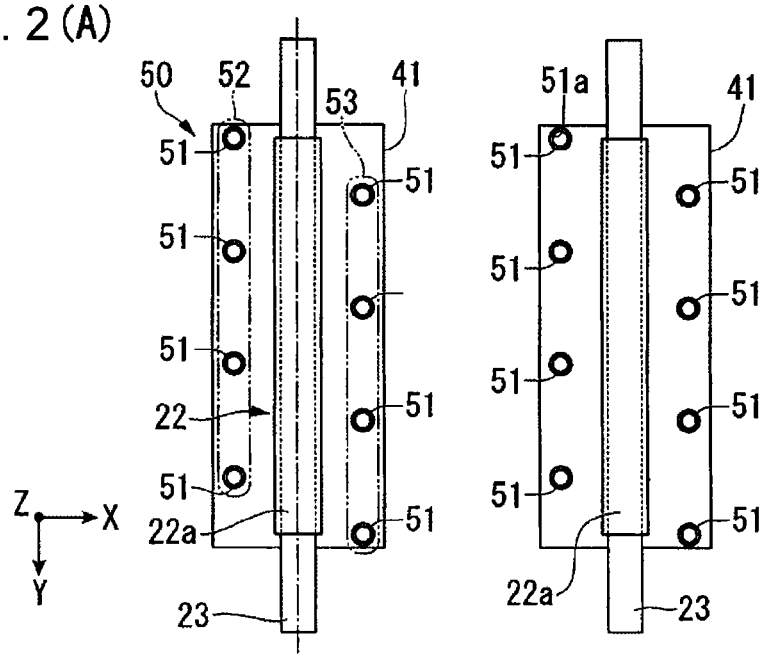
FIG. 2(A) is a transverse sectional view along the line A-A in FIG. 1.
FIG. 2(B) is a transverse sectional view along the line B-B in FIG. 1.
Figure 2:
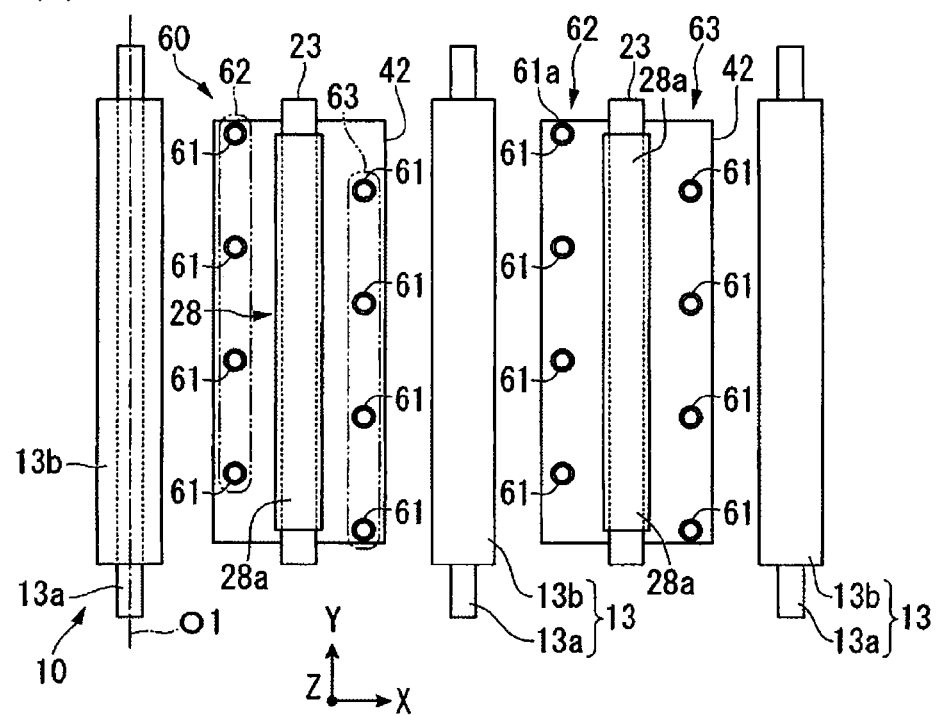
Figure 3:
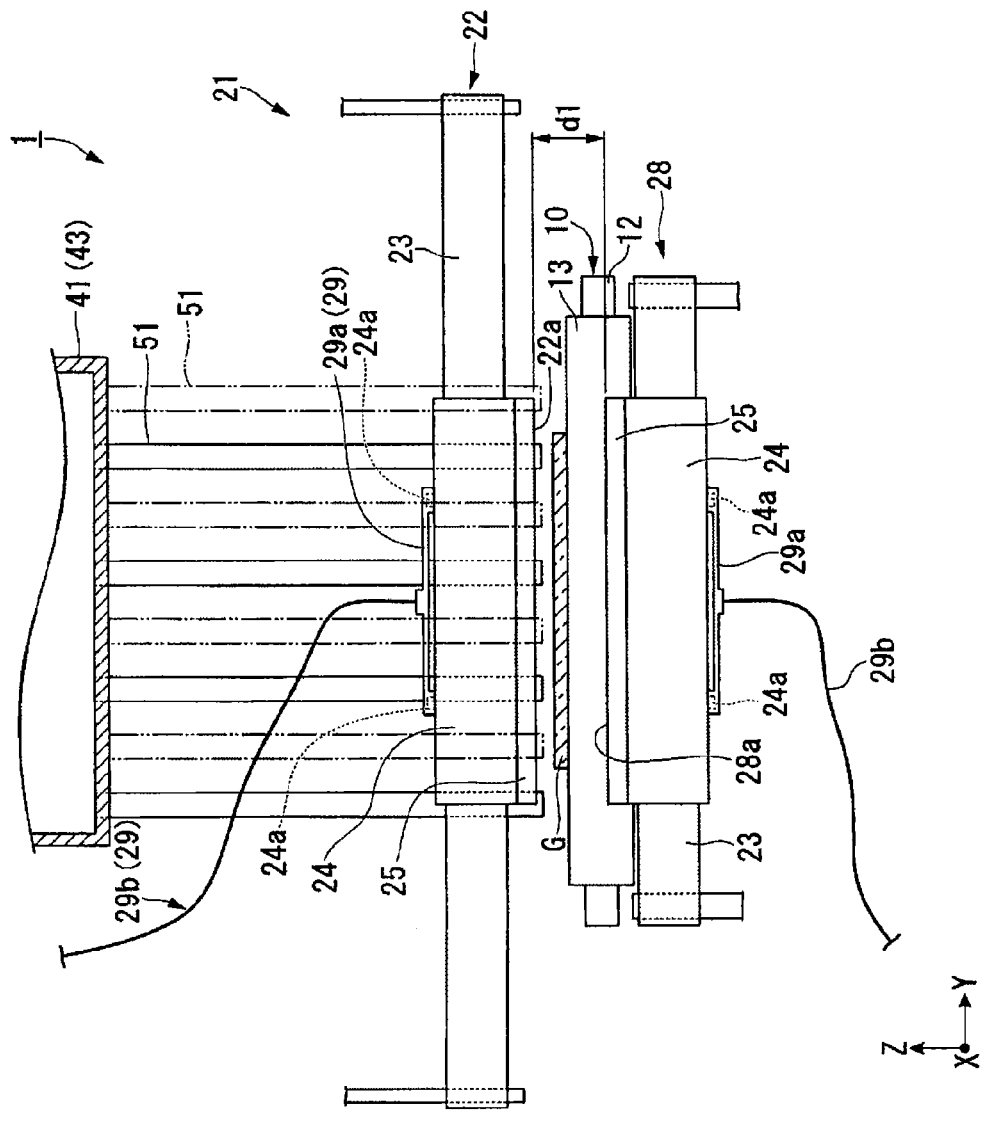
FIG. 3 is a vertical sectional view along the line C-C in FIG. 1.
Figure 4:
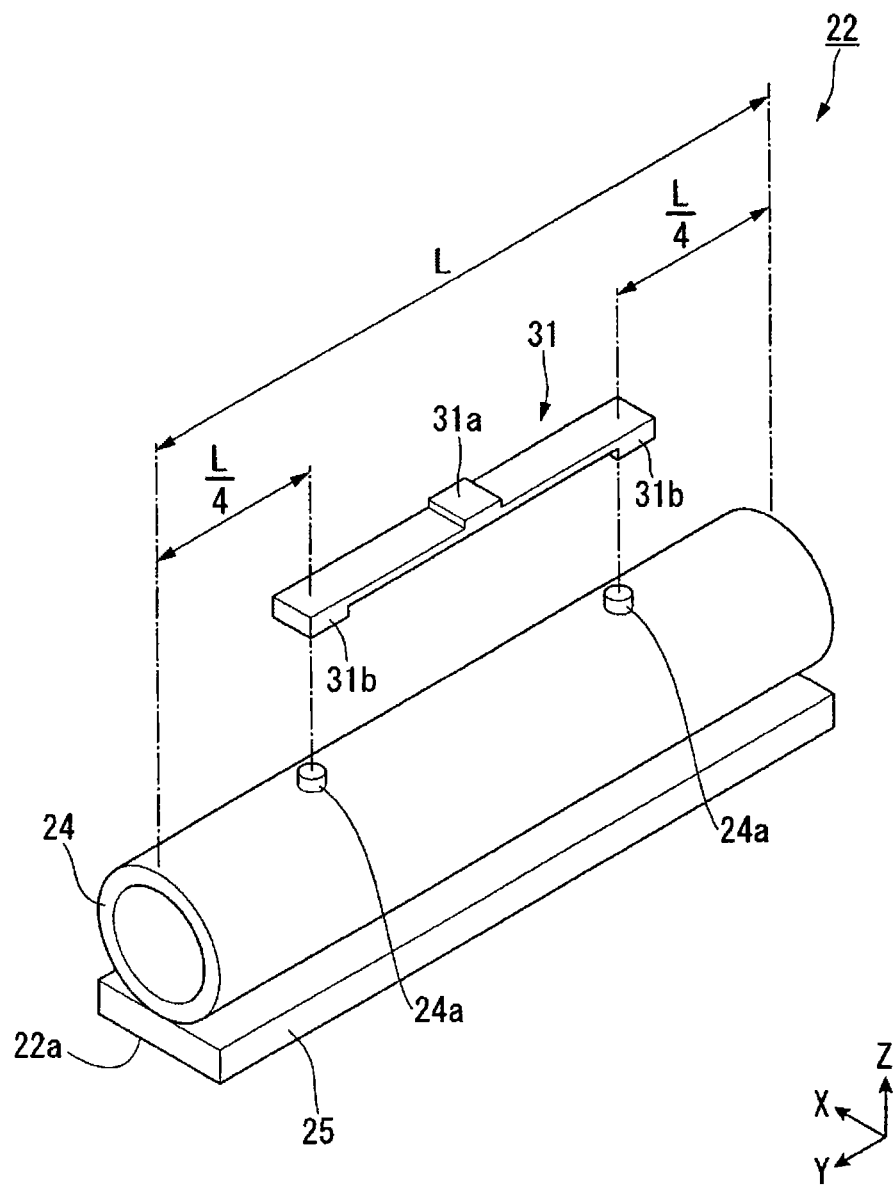
FIG. 4 is a perspective view showing the construction of a part of the same tempering apparatus.
Figure 5A:
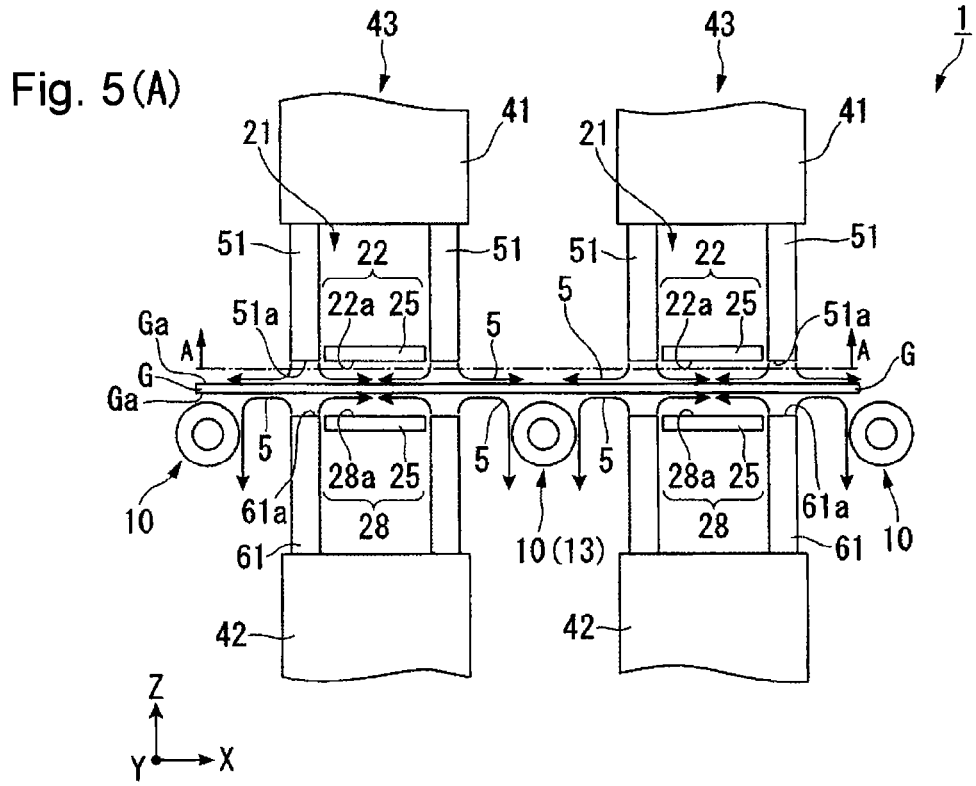
FIGS. 5(A) and (B) are views showing the operation of the same tempering apparatus during its use and the flow of the cooling medium.

Firstly, an apparatus (hereinafter simply referred to as "tempering apparatus") 1 for tempering a glass sheet in this embodiment will be described with reference to FIGS. 1 to 5. FIG. 1 is a vertical sectional view showing a cross section of the tempering apparatus 1 along the direction for conveying a glass sheet. FIG. 2(A) is a transverse sectional view along the line A-A in FIG. 1, and FIG. 2(B) is a transverse sectional view along the line B-B in FIG. 1. FIG. 3 is a vertical sectional view along the line C-C in FIG. 1. FIG. 4 is a perspective view showing the construction of a part in the tempering apparatus 1. FIGS. 5(A) and (B) are views showing the operation of the tempering apparatus 1 during its use and the flow of a cooling medium.

For illustrative purposes, X-axis, Y-axis and Z-axis which are perpendicular to one another, are set in FIGS. 1 to 5. The X-axis is an axis line parallel with the direction for conveying a glass sheet G, the Y-axis is an axis line parallel with the width direction of the tempering apparatus 1, and the Z-axis is an axis line perpendicular to the plane of a glass sheet G to be conveyed.

Further, in the present invention, the inside of a glass sheet means the entire inner side of a glass sheet in the thickness direction of the glass sheet, and the center portion of a glass sheet means an area having a certain thickness, including the center, in the thickness direction of the glass sheet. Further, the thickness of the region shall be within a range measurable by the after-described measurement method.

Further, in the present invention, the softening point is meant for a temperature at which the value log η of a glass sheet becomes 7.60 [Log Poise], the tempering point is meant for a temperature at which the value log η of a glass sheet becomes 9.4 [Log Poise], the annealing point is meant for a temperature at which the value log η of a glass sheet becomes 13.0 [Log Poise], and the strain point is meant for a temperature at which the value log η of a glass sheet becomes 14.5 [Log Poise].

Further, the conveying plane is a plane defined by the upper plane of a plurality of conveying rolls and substantially corresponds to a plane formed by a group of contact points of the conveying rolls with the lower surface of a glass sheet G to be conveyed.

The tempering apparatus 1 in this embodiment cools a heated glass sheet G to temper it.

As shown in FIG. 1, the tempering apparatus 1 comprises a conveying means 10 to convey a glass sheet G, a heating means 15 to heat the glass sheet G and a quenching means 40 to blow a cooling medium to both surfaces Ga in the thickness direction of the heated glass sheet G to quench the glass sheet G.

The conveying means 10 is one to convey the glass sheet G in a predetermined conveying direction (in the X-axis direction in this embodiment) and has conveying rolls (support members) 13 to support the glass sheet G in contact with at least a part of the surface Ga of the glass sheet G. As shown in FIG. 2(B), a plurality of conveying rolls 13 are provided at regular intervals in the X-axis direction, so that the center axis line O1 of each roll becomes parallel (including substantially parallel; the same applies hereinafter) with the Y-axis.

As shown in FIG. 2(B), a conveying roll 13 comprises a rotation axis 13a and a surface portion 13b formed to cover the outer circumference of the rotation axis 13a.

As the material for the rotation axis 13a, steel, stainless steel or an aluminum alloy, may, for example, be used. The surface portion 13b is made of a material having insulation properties. For example, a polyphenylene sulfide (PPS) resin or ceramics may be used. Thus, the conveying rolls 13 are electrically insulated from the after-described electrode units 21.

The conveying rolls 13 are connected to drive motors not shown and are rotated at a predetermined speed to convey the glass sheet G in the X-axis direction.

As shown in FIG. 1, the heating means 15 comprises a heating furnace (preheating means) 16 and a radio-frequency heating means 20.

The heating furnace 16 has a known construction such that the inside thereof is heated by using a gas or electricity as the energy source, and is designed to heat a glass sheet G to be conveyed by the conveying rolls 13.

The radio-frequency heating means 20 is one to heat a glass sheet G by radio-frequency heating and comprises an electrode unit 21 and a power source 35.

The electrode unit 21 is disposed in the vicinity of the outlet of the heating furnace 16 from which a glass sheet G is taken out, and as shown in FIG. 3, it comprises a feed electrode 22 disposed on one surface side in the thickness direction of the glass sheet G, and a passive electrode 28 disposed on the other surface side in the thickness direction of the glass sheet G.

As shown in FIG. 3, the feed electrode 22 comprises an insulating shaft member 23, an electrode-supporting member 24 and an electrode main body 25. The insulating shaft member 23 is formed in a cylindrical shape by using a material having insulating properties, such as alumina. The insulating shaft member 23 is inserted through the electrode-supporting member 24 and holds the electrode so that the longitudinal direction becomes parallel with the Y-axis.

As shown in FIG. 4, the electrode-supporting member 24 is formed in a cylindrical shape by using a material having electrical conductivity. As the material for the electrode-supporting member 24, copper or stainless steel, may, for example, be used.

The electrode-supporting member 24 has power feeding portions 24a to be connected to the power feeding side of the power source 35. The power feeding portions 24a are disposed at two positions with a predetermined distance in the Y-axis direction on the exterior surface of the electrode-supporting member 24, and when the length in the longitudinal direction of the electrode-supporting member 24 is represented by L, the positions are set to be located towards the center by L/4 from both ends of the electrode-supporting member 24.

The electrode main body 25 is a plate-form conductive member and has an electrode surface 22a, to which a radio-frequency voltage is applied. As shown in FIG. 3, the electrode main body 25 is attached to the electrode-supporting member 24 so that the electrode surface 22a faces the plane for conveying a glass sheet, which is formed by the conveying rolls 13.

As shown in FIG. 1, the feed electrode 22 is connected to the power source 35 by an electrode wiring 29. As shown in FIG. 3, the electrode wiring 29 comprises a branch wire 29a to be attached to the power feeding portions 24a, and a feeder cable 29b which connects the branch wire 29a to the power source 35.

The branch wire 31 is an electrically conductive member, and as shown in FIG. 4, it has a feeding point 31a provided at the center in the longitudinal direction, and connection terminals 31b formed at both ends in the longitudinal direction. The respective connection terminals 31b are electrically connected to the respective power feeding portions 24a of the electrode-supporting member 24. The distance between the feeding point 31a and each connection terminal 31b is equal, and therefore, the electrical distance from the power source 30 to each power feeding portion 24a is substantially equal.

The construction of the passive electrode 28 is substantially the same as the construction of the feed electrode 22, and it comprises an insulating shaft member 23, an electrode-supporting member 24 and an electrode main body 25. The electrode-supporting member 24 is connected to the passive side of the power source 35 by an electrode wiring 29 and connected also to earth (grounding means) not shown. For the convenience of description, the electrode surface of the passive electrode 28 will be referred to as the electrode surface 28a in the following description.

In the passive electrode 28, as shown in FIG. 3, the electrode surface 28a is disposed at a position to squarely face the electrode surface 22a of the feed electrode 22, and a radio-frequency voltage is applied to a glass sheet G between the electrode surfaces 22a and 28a, whereby the glass sheet G is subjected to radio-frequency heating.

As shown in FIG. 1, three power sources 35 are provided, and they are respectively connected to the respective electrode units 21. Therefore, each of the electrode units 21 can have the electric power adjusted independently.

In this embodiment, the power sources 35 will apply a radio-frequency voltage of 27.12 MHz to the electrode units 21, but the frequency of the radio-frequency voltage to be applied is not limited thereto. In the present invention, the frequency of the radio-frequency voltage may be suitably set based on the practical electrode voltage or the dielectric loss of a glass sheet to be heated, but it is preferably set to be from 1 MHz to 100 MHz, further preferably from 10 to 50 MHz. Within such a range, the operation can be carried out with a frequency which can be industrially used by laws and regulations in Japan, shielding of electromagnetic waves becomes easy as compared with electromagnetic waves having a high frequency, whereby the safety of installations will be increased, and designing and maintenance become easy and inexpensive. When the frequency of the radio-frequency voltage in radio-frequency heating is low, the standing frequency at a low voltage tends to be long, such being advantageous for uniform heating, and when the frequency becomes high, heating can be carried out at a low voltage, and discharge is less likely to occur.

As shown in FIG. 1, the quenching means 40 is disposed on each side in the thickness direction of a glass sheet G to be conveyed and comprises a plurality of chamber units (discharge means) 43 and nozzle units 50, 60. The quenching means in this embodiment employs air as a cooling medium.

The chamber units 43 each having box-shaped upper chamber 41 and lower chamber 42 extending in the Y-axis direction, are arranged in the X-axis direction at predetermined intervals. The upper chamber 41 has a nozzle unit 50 extending towards the conveying plane from the lower surface facing the conveying plane. The lower chamber 42 has a nozzle unit 60 extending towards the conveying plane from the upper surface facing the conveying plane.

Each of the upper chambers 41 and the lower chamber 42 has a container shape capable of storing air inside by an air discharging means not shown (see FIG. 3).

The above-described electrode unit 21 is disposed between the upper chamber 41 and the lower chamber 42. Further, the above-described conveying roll 13 is disposed between the adjacent lower chambers 42.

As shown in FIG. 2(A) and FIG. 2(B), the nozzle units 50 and 60 are provided with cylindrically-formed plural nozzles 51 and 61. A nozzle unit 50 attached to the upper chamber 41 has eight nozzles 51 each having an opening 51a formed at its forward end and directed downwards. A nozzle unit 60 attached to the lower chamber 42 has eight nozzles 61 each having an opening 61a formed at its forward end and directed upwards. The respective nozzles in the nozzle units 50 and 60 are arranged in two rows in the form of nozzle lines 52 and 53 and nozzle lines 62 and 63, respectively, in each of which, four nozzles are lined with equal internals in the Y-axis direction. Here, the number of nozzles in each nozzle unit or the number of nozzle lines is exemplary and may be suitably set.

The plurality of openings 51a and 61a of the nozzle units 50 and 60 are disposed at such positions that as viewed from the X-axis direction, openings in the adjacent nozzle lines do not overlap with each other.

Among nozzles 51 and 61 provided in nozzle units 50 and 60, at least nozzles 51 on the heat electrode 22 side are formed of a material having insulating properties, and the nozzle unit 50 is electrically insulated from the electrode unit 21. As an insulating material, it is possible to use, for example, a PPS resin or ceramics.

In this embodiment, the respective nozzles 51 and 61 of the nozzle units 50 and 60 are formed of an insulating material, and both the nozzle units 50 and 60 are insulated from the electrode units 21.

Figure 5B:
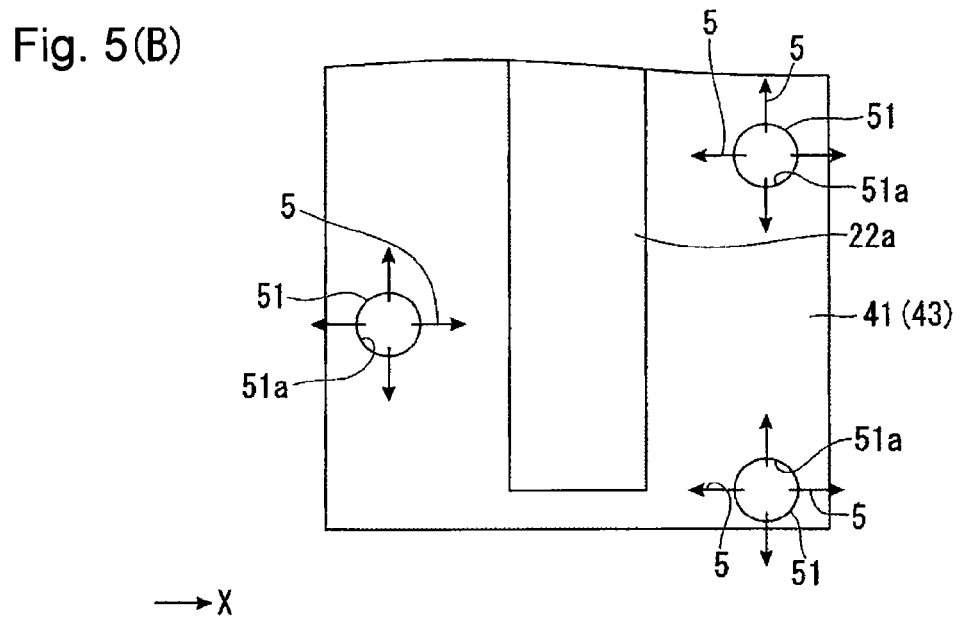

As shown in FIG. 5(A) and FIG. 5(B), in the quenching means 40 having the above-described construction, air 5 as a cooling medium discharged from openings 51a and 61a of nozzles 51 and 61 of a chamber unit 43 is blown to both surfaces of a glass sheet G to cool the surfaces Ga. The blown air 5 move along the surfaces Ga while removing heat from the glass sheet G and will be discharged from e.g. a space between adjacent chamber units 43.

Here, as shown in FIG. 5(B) as partially enlarged, openings 51a and 61a in adjacent nozzle lines are disposed not to overlap with each other, as viewed from the X-axis direction, whereby it is possible to avoid collision of streams of air discharged from openings 51a (and 61a) and advancing in parallel with the X-axis thereby to cause retention or slow down of the flow rate, and thus is possible to improve the cooling efficiency.

Now, the method for tempering a glass sheet (hereinafter referred to simply as a "tempering method") in this embodiment, will be described with reference to FIGS. 6 to 8. In the following description, the temperature conditions, etc. are in a case where soda lime silicate glass (softening point: 730° C., tempering point; 657° C., annealing point: 550° C., strain point: 520° C., thickness: 2.8 mm) was used as a glass sheet G.

FIG. 6(A), FIG. 6(B), FIG. 6(C) and FIG. 6(D) are vertical cross-sectional views showing stresses to be formed in a glass sheet G in a method for tempering a common glass sheet. Further, FIG. 7 is a process diagram for illustrating process steps of the tempering method in this embodiment. Further, in FIG. 6, an arrow directed to the alternate long and short dash line showing the center of the Fig. represents a compression stress, and an arrow directed in the opposite direction represents a tensile stress. A dashed line having symbol X added represents a relaxed stress.

Firstly, the mechanism to temper a glass sheet in the tempering method in this embodiment will be described with reference to FIG. 6(A) to FIG. 6(D).

Firstly, the glass sheet G is uniformly heated. The glass sheet G is thereby uniformly expanded, and accordingly no compression stress or tensile stress will be formed between both surfaces Ga in the thickness direction (in the vertical direction in the Fig.) of the glass sheet G and the center portion Gb in the thickness direction of the glass sheet G (see FIG. 6(A)).

Figure 6A:
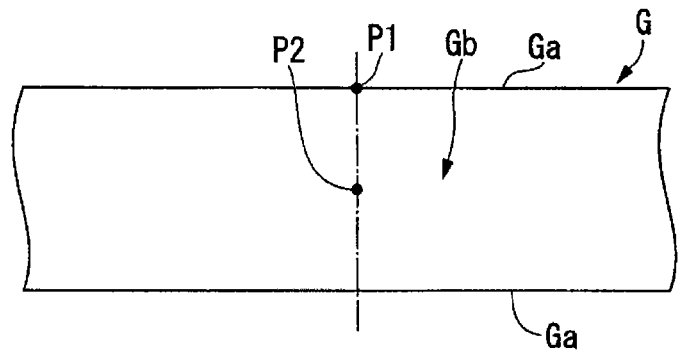
FIGS. 6(A), (B), (C) and (D) are views for illustrating the stresses formed in a glass sheet in the method for tempering the glass sheet of the present invention.
Figure 6B:
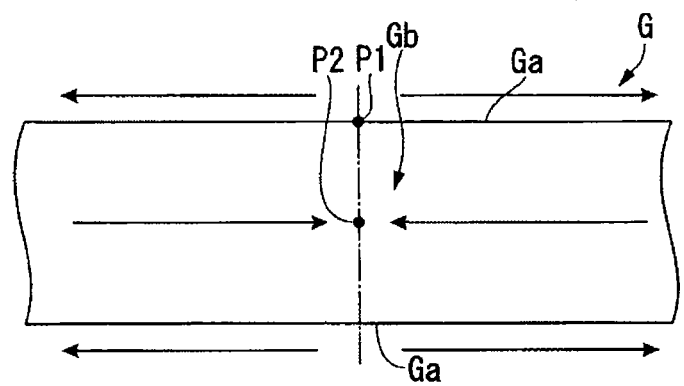

Then, as shown in FIG. 6(B), the surfaces Ga of the glass sheet G are cooled. At that time, at the position P1 of the surface Ga of the glass sheet G, the surface Ga is cooled and tends to shrink, but the center portion Gb has not yet been cooled and does not shrink, whereby due to a difference in expansion coefficient between the surfaces Ga and the center portion Gb, a tensile stress will be formed at the surfaces Ga. On the other hand, at the center portion Gb of the glass sheet G, at the position P2 at the center portion Gb of the glass sheet G, a compression stress will be formed at the center portion Gb, since the surfaces Ga do not expand.

Figure 6C:
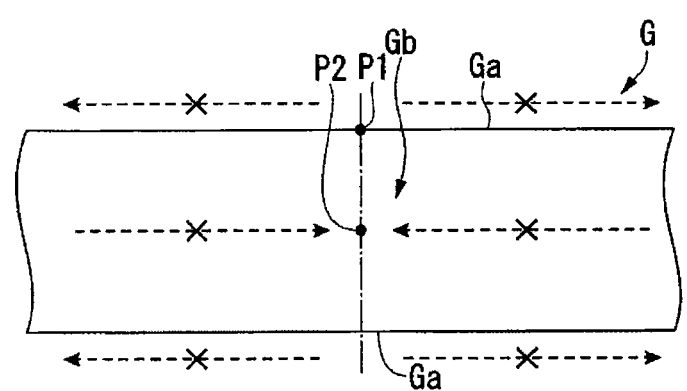

Then, when the glass sheet G is maintained in a temperature state of at least the strain point, while permitting the temperature difference to remain as described above between the surfaces Ga and the center portion Gb of the glass sheet G, as shown in FIG. 6(C), the stress formed in a state where the temperature difference is formed between the surfaces Ga and the center portion Gb of the glass sheet G, will be relaxed (stress relaxation).

Figure 6D:
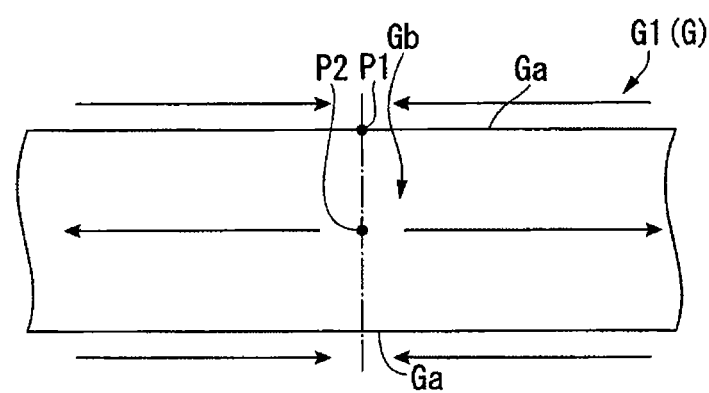

Finally, the stress-relaxed glass sheet G is quenched for tempering by blowing a cooling medium to both surfaces in the thickness direction. The glass sheet G quenched to ordinary temperature has shrinkage larger at the center portion Gb having a higher temperature than the surfaces Ga, and a permanent strain will remain. As a result, the relation between the compression stress and the tensile stress shown in FIG. 6(B) is reversed as shown in FIG. 6(D) to obtain a physically tempered glass sheet G1 wherein a compression stress remains at the surfaces Ga of the glass sheet G and a tensile stress remains at the center portion Gb.

Next, each step in the tempering method in this embodiment will be described.

FIG. 7 is a process diagram showing the process steps in the tempering method, wherein the abscissa represents the time, and the ordinate represents the temperature of the glass sheet G. Further, the temperature at the surfaces Ga and the center portion Gb of the glass sheet G are shown together in FIG. 7.

As shown in FIG. 7, this tempering method comprises a heating step, a pre-quenching step, a quenching step and an internal heating substep of selectively heating the vicinity of the center portion in the thickness direction of the glass sheet, against the surfaces, at least in the quenching step.

In FIG. 7, the ordinate represents the temperature of the glass sheet, and the abscissa represents the time. Of the two solid lines, the upper line represents the temperature at the center portion of the glass sheet, and the lower line represents the temperature at the surfaces of the glass sheet. Further, the time $t_0$ is the time when the heating step was initiated. Further, the time $t_1$ is the time when the pre-quenching step was initiated. The time $t_2$ is the time when the heating was initiated from the inside of the glass sheet by e.g. radio-frequency, the time $t_3$ is the time when the heating from the inside of the glass sheet was terminated, and the time $t_4$ is the time when the quenching step was initiated. In the embodiment shown in FIG. 7, the time $t_2$ and the time $t_4$ are substantially the same, i.e. the initiation time point of the internal heating substep is substantially the same as the initiation time point of the quenching step.

Firstly, in the heating step, the glass sheet G is heated to a temperature close to the softening point (the predetermined temperature $T_5$ in the vicinity of the outlet of the heating furnace). Specifically, the glass sheet G is heated to a temperature lower than the softening point and higher than the annealing point by using a heating furnace 16. For example, in the case of soda lime silicate glass, the glass sheet G is heated to 650° C.

In the subsequent quenching step, a cooling medium is blown to both surfaces Ga in the thickness direction of the glass sheet G, for cooling. As a result, for example, at the time $t_2$, the temperature at the center portion Gb of the glass sheet G is cooled to a temperature $T_3$ which is lower than the predetermined take-out temperature $T_5$. At the same time, the temperature at the surfaces Ga of the glass sheet G is cooled to a temperature $T_2$ further lower than the temperature of the center portion Gb of the glass sheet G, whereby a temperature difference will be formed between the surfaces Ga and the center portion Gb of the glass sheet G.

Then, in the internal heating substep from the time $t_2$ to the time $t_3$, the glass sheet G is heated by heat generation from the inside of the glass sheet G, while cooling by means of a cooling medium as mentioned above, is continued. By carrying out the internal heating substep, the temperature difference between the surfaces Ga and the center portion Gb of the glass sheet G at the time $t_3$, becomes larger than the temperature difference at the time $t_2$ when the internal heating substep was initiated. Thus, at least one time point after the time $t_2$, a temperature difference which is practically impossible by a conventional tempering method, is formed in the glass sheet G. For example, it is possible to attain a state such that at the time $t_3$, the temperature $T_4$ at the center portion Gb in the thickness direction of the glass sheet G is close to the tempering point, and the temperature $T_1$ at the surfaces Ga in the thickness direction is at most the annealing point. Here, an example is shown wherein at the time $t_3$, the temperature difference between the temperature at the center portion of the glass sheet and the temperature at the surfaces becomes the maximum, but the time point where the temperature difference becomes the maximum is not limited to the time $t_3$, and may suitably be changed before or after the time $t_3$ depending upon the cooling ability, the heat conductivity of the glass sheet, etc. Further, in the internal heating substep, the temperature at the center portion of the glass sheet may be increased, or so long as the temperature difference from the surface temperature can be obtained sufficiently even by maintaining the temperature at the center portion or by reducing the temperature lowering rate, the effects of the present invention will not be impaired.

After the time $t_3$, the quenching step is continued without accompanying heating from the inside, and this tempering method is terminated when the entire glass sheet is cooled and tempered to normal temperature.

Radio-frequency heating or heating by means of short wavelength infrared light may, for example, be mentioned as a method for heating a glass sheet G by heat generation from the inside in the internal heating substep. Among them, radio-frequency heating has a characteristic such that a glass sheet having a high temperature generates more heat than a glass sheet having a low temperature, since the dielectric loss is larger. Accordingly, like the time $t_2$ in the quenching step, when a temperature difference is formed between the surfaces Ga and the center portion Gb of a glass sheet G so that the center portion Gb has a higher temperature than the surfaces Ga, the center portion Gb tends to be more readily heated than the surfaces Ga, whereby there is such a merit that a larger temperature difference can be created between the surfaces Ga and the center portion Gb.

Further, details of the heating by means of short wavelength infrared light will be described later.

According to the tempering method in this embodiment, the internal heating substep is carried out during the quenching step, whereby the temperature difference between the surfaces Ga and the center portion Gb of a glass sheet G can be made larger. It is thereby possible to make the compression stress larger at the surfaces of a glass sheet which becomes normal temperature via stress relaxation and thereby to produce a glass sheet having the strength more improved. Further, it is becomes possible to temper a glass sheet having a thin thickness or a glass sheet having a high thermal conductivity, which used to be difficult to temper. Further, at that time, fragments at the time of fracture preferred as a safety glass sheet for vehicles can be realized.

Further, the internal heating substep is carried out after the glass sheet G has been cooled for a predetermined time in the pre-quenching step, whereby it becomes possible to lower the take-out temperature in the heating step. As a result, the viscosity of glass during the take out will not decrease too much, whereby it is possible to reduce a strain of the glass sheet G and to improve the surface quality.

Further, it is possible to delay the initiation timing of the quenching step, whereby it is possible to prevent breakage due to an initial tensile stress by cooling of the surfaces of the glass sheet.

Further, according to the above-described tempering apparatus 1 in this embodiment, the heating means 15 comprises a heating furnace 16 and a radio-frequency heating means 20, whereby the heating step and the internal heating substep in the tempering method of the present invention can suitably be carried out.

Further, the electrode units 21, the nozzle units 50 and 60 and conveying rolls 13 of the conveying means 10 are electrically insulated, and therefore, no conductor is exposed at a distance closer than the distance between the pair of electrode surfaces 22a and 28a, whereby a possibility of discharge from the electrode units 21 is reduced. As a result, it is possible to increase the radio-frequency heating voltage more to increase the electric field intensity between the pair of electrode surfaces 22a and 28a. It is thereby possible to carry out heating to a desired temperature more efficiently by utilizing heat generation from the inside of the glass sheet G while preventing electric discharge.

Further, the nozzle units 50 and 60 and the surface portions 13b of the conveying rolls 13 are made of an insulator, whereby the electrode units 21, the nozzle units 50 and 60 and the conveyer rolls 13 may be disposed close to one another. As a result, it is possible to carry out the internal heating substep suitably by further increasing the heating efficiency and the cooling efficiency.

Further, in the nozzle units 50 and 60, nozzle lines 52, 53, 62 and 63 are disposed so that an electrode unit 21 is located therebetween in the X-axis direction, and when openings 51a and 61a of nozzles 51 and 61 are viewed from the conveying direction (X-axis direction), adjacent openings 51a and 61a are disposed at positions not to overlap with each other. Therefore, streams of air 5 discharged from the openings 51a and 61a of the nozzles 51 and 61 are less likely to interfere or collide with each other to stay and will readily be discharged. As a result, it is possible to increase the flow rate of air 5 at the surfaces Ga of a glass sheet G and to quickly cool the surfaces of the glass sheet.

Further, electrode wiring 29 connects the power source 35 and the respective power feeding portions 24a so that the distances from the power source 35 to the respective power feeding portions 24a become substantially equal, whereby a voltage can equally be applied at the electrode main body 25. Therefore, it is possible to reduce localization of the electrical field intensity in the space defined by the electrode surfaces 22a and 28a.

In the above description of FIG. 7, the tempering method in this embodiment has been described in such a mode that the internal heating substep is carried out during the quenching step. However, it is also possible to adopt such a mode that between the time $t_1$ and the time $t_2$ is a pre-quenching step wherein a heated glass sheet is cooled by means of e.g. a preliminary cooling means, then between the time $t_2$ and the time $t_3$, is an internal heating step wherein the vicinity of the center portion in the thickness direction of the glass sheet is selectively heated against the surfaces, and after the time $t_3$ is a quenching step wherein the above glass sheet is quenched after the internal heating step. Even if such a mode is adopted, there is no change in the advantageous effects of the tempering method of the present invention.

In the embodiment in FIG. 7, a case has been described wherein quenching of a glass sheet is initiated by a quenching means at the same time as the initiation of heating from inside of the glass sheet in the internal heating step. However, the timing for the initiation for the internal heating may be at an intermediate time point in the pre-quenching step or after initiation of quenching. FIG. 8 is a process diagram showing the process steps of a tempering method similar to FIG. 7 and shows a case wherein the timing for initiation of the internal heating is at an intermediate time point in the pre-quenching step. FIG. 9 is likewise a process diagram showing the process steps of the tempering method and shows a case wherein the timing for initiation of the internal heating is after initiation of quenching (i.e. at an intermediate time point in the quenching step).

Figure 8:
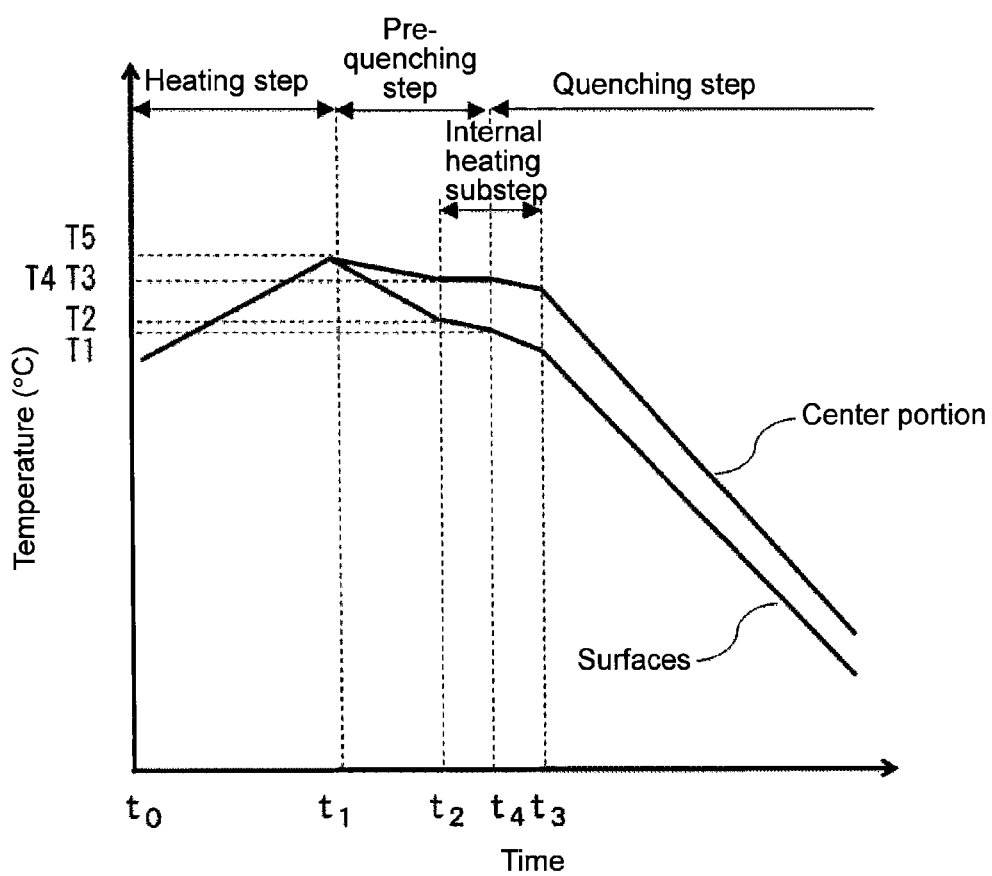
FIG. 8 is a process diagram illustrating a tempering method in another embodiment of the present invention.
Figure 9:
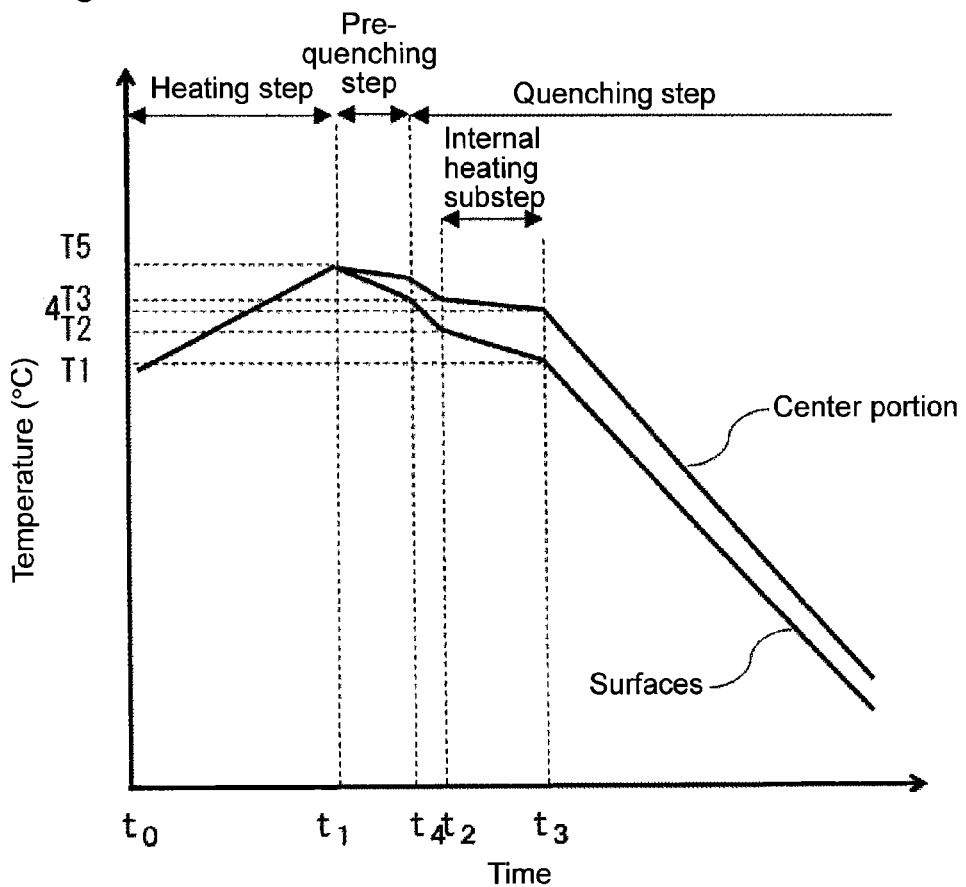
FIG. 9 is a process diagram for illustrating a tempering method in another embodiment of the present invention.

Further, as shown in FIG. 8, the temperature at the center portion and the temperature at the surfaces in the thickness direction of a glass sheet between the time $t_2$ and the time $t_3$ in the internal heating substep are not necessarily increased and may be maintained at the substantially the same temperatures as shown by T3 (T4) in FIG. 8. Further, the internal heating substep may be initiated in the pre-quenching step prior to $t_4$. Further, as shown in FIG. 9, in the internal heating substep, the temperature of the glass sheet, particularly the temperature at the center portion of the glass sheet, may gradually decrease, like from T4 to T3.

In the present invention, the quenching step is a step which starts by initiation of blowing a cooling medium for the quenching and ends by completion of blowing of the cooling medium. The heating step is a step of heating a glass sheet to a temperature at which tempering can be made by quenching. The pre-quenching step is a stage from the completion of the heating step to the initiation of blowing of the cooling medium in the quenching step.

After the pre-quenching step, the surface temperature of the glass sheet decreases, and the surface temperature of the glass sheet shows the highest temperature at the initiation of the pre-quenching step in the subsequent steps (including the quenching step). In the pre-quenching step, the glass sheet may be heated in order to maintain the temperature of the glass sheet or in order to slow down the speed of the temperature decrease of the glass sheet. However, in the pre-quenching step, there is no increase of the surface temperature of the glass sheet.

In the pre-quenching step, forming such as bending may be applied to the heated glass sheet, but even in such a case, there is no increase of the surface temperature of the glass sheet. In a case where a glass sheet taken out from the heating furnace is heated again, so that the surface temperature increases, such a step of carrying out heating again is deemed to be the heating step in the present invention. For example, in a case where the heated glass sheet is shaped and heated again to a temperature required for the subsequent tempering, such a step of heating the glass sheet after shaping, is deemed to be the heating step in the present invention.

In the present invention, the internal heating (step) is initiated within a period from an intermediate time point in the pre-quenching step to an intermediate time point in the quenching step, and terminated at an intermediate time point in the quenching step. The intermediate time point in the pre-quenching step means the time point after a temperature difference is formed between the inside and the surfaces of the glass sheet so that selective internal heating becomes possible. The internal heating may be initiated at the same time as quenching or may be initiated after initiation of quenching. At least after the initiation of quenching, a temperature difference is formed between the inside and the surfaces of the glass sheet, and selective internal heating is possible. In a usual case, even without carrying out an active cooling, selective internal heating is possible at the initiation of quenching by natural cooling in the pre-quenching step. In such a case, if possible, the internal heating may be initiated before the initiation of quenching. In a case where a sufficient temperature difference is not formed between the inside and the surfaces of the glass sheet at the initiation of the quenching, it is preferred to carry out active cooling in the pre-quenching step. Further, in a case where active cooling is to be carried out in the pre-quenching step, the internal heating may be initiated before the initiation of quenching, if possible.

The termination of the internal heating is at an intermediate time point in the quenching step, and this means that in the present invention, the internal heating is carried out at least in quenching irrespective of its initiation time point.

In quenching without internal heating, the surface temperature of a glass sheet rapidly decreases, since the difference between the initial surface temperature and the temperature of the cooling medium is large, and thereafter, as the surface temperature decreases, the difference between the surface temperature and the temperature of the cooling medium decreases, and the speed of the temperature decrease lowers.

On the other hand, with respect to the internal temperature of a glass sheet, since the thermal conductivity from the inside to the surface is low, the speed of the temperature decrease of the inside temperature is small, and at the initial stage of quenching, the difference between the inside temperature and the surface temperature increases as the time passes. However, thereafter, the lowering speed of the surface temperature decreases, and the difference between the lowering speed of the surface temperature and the lowering speed of the inside temperature by heat conduction from the inside to the surface becomes small, and the difference between the surface temperature and the inside temperature decreases as the time passes. The time point when the difference between the surface temperature and the inside temperature becomes maximum, is in the quenching step, and the relation between the time point when the difference became maximum, and the tempering point, annealing point and stain point of glass becomes a factor for the tempering of the glass sheet.

In the present invention, wherein internal heating is carried out during quenching, the surface temperature of the glass sheet decreases during the quenching even when the internal heating is carried out. As compared with a case where no internal heating is carried out, the lowering speed of the surface temperature of the glass sheet which is subjected to internal heating during the quenching may become lower, but there is no possibility that the surface temperature does not change or increases. On the other hand, as mentioned above, with respect to the inside temperature at that time, the speed of the temperature lowering decreases as compared with a case where no internal heating is carried out, or there may be a case where the temperature is maintained or the temperature increases. Even in a case where the speed of the temperature lowering of the inside temperature decreases, such a lowering speed is slow as compared with the lowering speed of the surface temperature. Accordingly, by the internal heating, the maximum value of the difference between the surface temperature and the inside temperature of the glass sheet during the quenching becomes large as compared with a case where internal heating is not carried out. Thus, it becomes possible to carry out tempering efficiently without increasing the cooling power for tempering or without heating the glass sheet to a high temperature for tempering. Further, it becomes possible to easily carry out tempering of a glass sheet made of a thin glass sheet or a glass sheet having a high heat conductivity which used to be difficult to temper.

In the internal heating substep, when the inside of the glass sheet is selectively heated while being cooled, the temperature of the inside may increase, decrease or be maintained. When the heat energy taken out per unit time from the inside by cooling is represented by $-Ec$, and the heat energy added per unit time to the inside by heating is represented by $+Es$ (provided that no thermal energy is supposed to be added to the surface portion), if the value of $(-Ec+Es)$ is negative, the inside temperature decreases (provided that the temperature lowering speed is smaller than a case where $+Es=0$). If the value of $(-Ec+Es)$ is 0, the inside temperature is maintained, and if it is positive, the inside temperature increases.

The above $-Ec$ represents the heat energy taken out by heat conduction from the high temperature inside to the low temperature surface, and as the temperature difference between the inside and the surface is large, more heat energy is taken out. $+Es$ derives from the energy added by electromagnetic waves, and as the inside temperature becomes high, the value of $+Es$ becomes large by more absorption even if the electromagnetic wave energy is constant, and reversely, the value of $+Es$ becomes small as the inside temperature decreases. Thus, the value of (−Ec+Es) is not usually constant, as each of values of −Ec and +Es changes by the temperature change of the inside and the surface.

As described above, the tempering method of the present invention includes an embodiment wherein in a process of cooling a glass sheet once heated to a temperature close to the softening point of glass, energy is applied to suppress the temperature decrease thereby to maintain the inside temperature or to minimize the speed of the temperature decrease of the inside temperature. Even in such an embodiment wherein the temperature at the center portion of the glass sheet does not increase, the effect of the present invention to create a substantial temperature difference between the surfaces and the center portion of a glass sheet can be accomplished in the same manner as the above-described embodiment.

Further, in a case where the above-described radio-frequency heating is employed as the heating means, by such a characteristic that the center portion Gb is more readily heated than the surfaces Ga, it is also possible to obtain an effect such that a high temperature site is heated more efficiently in the internal heating substep thereby to further increase the temperature difference in the thickness direction of glass.

Further, in the pre-quenching step in the present invention, the glass sheet may be actively cooled by means of e.g. a preliminary cooling means, or a passive and intentional cooling by e.g. providing natural cooling time, may be included. Further, an avoidable passive temperature decrease resulting e.g. from the transportation, may be utilized.

In the tempering method of the present invention, when the temperature at the center portion in the thickness direction of the glass sheet is close to the tempering point, the difference between the temperature at the center portion and the temperature at the surfaces in the thickness direction of the glass sheet is preferably at least 100° C., further preferably at least 150° C., or the temperature at the surfaces in the thickness direction of the glass sheet is preferably at most the strain point minus 20° C., whereby a larger temperature difference can be created, and it becomes possible to temper a glass sheet having a thinner thickness or a glass sheet having a high heat conductivity. Further, even if the above-mentioned temperature difference is less than 100° C., it is possible to obtain the desired effects by its combination with another tempering method.

The temperature at the center portion of the glass sheet at the time of initiation of the radio-frequency heating is preferably close to the tempering point. Close to the tempering point is preferably a temperature at which the value of log η of the glass sheet becomes 9.4±1.2 [Log Poise], more preferably a temperature at which the value of log η becomes 9.4±0.8 [Log Poise]. If the value of log η is smaller than the above range, the glass tends to be soft, whereby it tends to be difficult to maintain the shape, or a distortion may remain. If the value of log η is larger, the glass tends to be hard, whereby it tends to be easily broken by a temporary strain by initial cooling, or the residual strain to be imparted to tempered glass tends to be small.

Now, the optimum relation between the temperature at the surfaces and the temperature at the center portion of the glass sheet in the tempering method of the present invention will be described.

Figure 10:
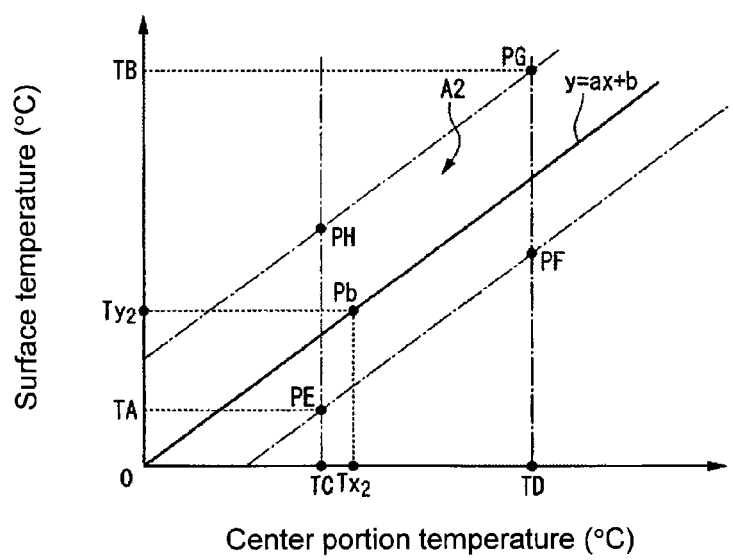
FIG. 10 is a graph showing the optimum relation of temperatures to temper a glass sheet.

FIG. 10 is a graph showing the optimum temperature relation to temper a glass sheet.

As shown in FIG. 10, in the tempering method in this embodiment, it is preferred that the temperatures at which the temperature difference between the surfaces and the center portion of the glass sheet becomes maximum, satisfy a primary expression of y=ax+b (where x is the temperature at the center portion, y is the temperature at the surfaces, and a and b are constants).

The value of the above constant a is preferably from 0.5 to 0.65, more preferably close to 0.5. Further, the value of the constant b is preferably from 60 to 180.

Here, with respect to the temperature for tempering a glass sheet, for example, as shown in FIG. 10, the temperature at the center portion is further preferably within a range of from the minimum value TC to the maximum value TD. In this case, the point Pb showing the combination of the temperature at the center portion and the temperature at the surfaces of the glass sheet may properly be in a region A2 defined by points PE, PF, PG and PH. At that time, TC is preferably at least 620° C., and TD is preferably at most 700° C. Further, the surface temperature TB determining PG is further preferably at most 490° C.

As described in the foregoing, it is possible to obtain the temperature difference and the combination conditions of the temperature in the vicinity of the center portion and the temperature at the surfaces in the thickness direction of the glass sheet required in the quenching step of the present invention. For example, in the case of soda lime silicate glass to be used for safety glass for vehicles to be used for e.g. automobiles, the surface temperature of the glass sheet when the temperature in the vicinity of the center portion in the thickness direction of the glass sheet is close to the tempering point, is preferably at most the annealing point, more preferably at most 490° C.

Next, to verify the validity of the tempering method of the present invention, simulation by a computer was carried out, and its details will be described. In this simulation, common air-cooling treatment was applied to a glass sheet having a thickness of from 2.0 to 2.8 mm, and at the same time, when the glass sheet reached the predetermined surface temperature and center temperature, radio-frequency heating was used in combination for heating, wherein the heating was carried out so that at least the surface temperature was at most the softening point, and the temperature at the center portion became close to the tempering point.

The conditions for the simulation were such that the time until initiation of radio-frequency heating after taking out the glass sheet from a heating furnace was 3.4 seconds, 4.6 seconds or 5.3 seconds in Example 1, 2 or 3, respectively, and the time until initiation of quenching was 2 seconds in each case. Further, the time for application for radio-frequency heating was two seconds, and the quenching time was 98 seconds. The results thereby obtained are shown in Table 1.

TABLE 1

|  | Thickness of glass sheet mm | Cooling power kcal/m2/hr/° C. | Center portion temperature ° C. | Surface temperature ° C. | Tempered degree |
| --- | --- | --- | --- | --- | --- |
| Ex. 1 | 2 mm | 500 | 651 | 495 | Tempered OK |
| Ex. 2 | 2.5 mm | 400 | 680 | 515 | Tempered OK |
| Ex. 3 | 2.8 mm | 350 | 660 | 490 | Tempered OK |

Figure 11:
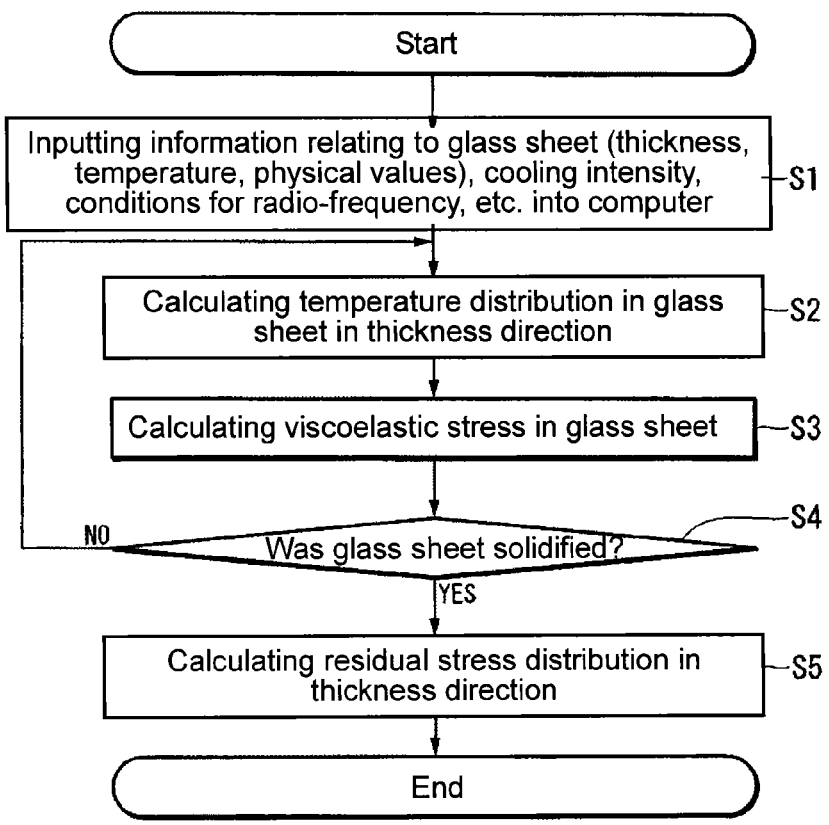
FIG. 11 is a flow chart showing a simulation procedure.

On the other hand, the above method for simulation of the production of tempered glass is based on a simulation technique proposed by Narayanaswamy (Narayanaswamy O. S., Journal of the American Ceramics Society, Vol. 61, No. 3-4 (1978), 146-152). The glass sheet tempering simulation proposed by Narayanaswamy is a method wherein as shown in FIG. 11, using, as input conditions, the thickness of a glass sheet, the initial temperature, the cooling intensity, the thermal physical property values and viscoelasticity physical values of the glass sheet (step S1), changes with time of the temperature distribution and the thermoviscoelastic stress distribution in the thickness direction of the glass sheet during cooling are calculated (steps S2 and S3), and finally the residual stress distribution in the thickness direction of the tempered glass sheet obtained after solidification of the glass sheet, is obtained (steps S4 and S5). Here, in these Examples, in step S2, in consideration of an influence of the radio-frequency heating, the temperature distribution of the glass sheet in the thickness direction is calculated from the following temperature calculation formula based on the Narayanaswamy method. Here, the calculating area is 1D [one-dimensional] space.

[Temperature Calculation Formula]

$$\rho C_p \frac{\partial T}{\partial t} = \frac{\partial}{\partial x}\left(\lambda \frac{\partial T}{\partial x}\right) + Q$$

Here, $\rho$, $C_P$ and $\lambda$ represent the density, specific heat and heat conductivity, respectively, of a glass sheet, t represents the temperature of the glass sheet, and t and x represent the time and the coordinate in the thickness direction, respectively. In this temperature calculation formula, Q represents the amount of heat generation per unit volume and unit time by the radio-frequency heating and can be obtained from electric power P to be consumed as heat per unit volume, which is obtained by the following formula.

[Radio-Frequency Dielectric Heating Formula]

$$P = 5/9 \times 10^{-12} \times f \times E^2 \times \in_r \times \tan \delta \, [W/cm^2]$$

Here, $\in_r$ and $\tan \delta$ are the dielectric constant and dielectric loss angle of the glass sheet, respectively. In the calculation of the thermoviscoelastic stress of glass in step S3 and the calculation of the residual stress distribution in the thickness direction in step S5, the following series of equations are solved based on the Narayanaswamy method, thereby to calculate the thermoviscoelastic stress.

[Fictive Temperature Calculation Formula]

$$T_f(x, t) = T(x, t) - \int_0^t M_v[\xi(x, t) - \xi(x, t')] \frac{\partial T(x, t')}{\partial t'} dt'$$

In the formula, the fictive temperature $T_f$ is a parameter to express the molecular structure of glass, and $M_V$ is a function to express the behavior for relaxation of the structure, and $\xi$ is a calculated time. The calculated time is calculated by the following formula.

[Calculation Formula for Calculated Time]

$$\xi(x, t) = \int_0^t \frac{\tau_{ref}}{\tau(T(x, t'))} dt'$$

Here, $\tau$ is a relaxation time, and $\tau_{ref}$ means a relaxation time at a reference temperature. Based on the values obtained by the foregoing formulae, the thermoviscoelastic stress $\sigma$ in the thickness direction in the glass sheet during cooling is calculated from the following formula.

[Calculation Formula for Thermoviscoelastic Stress]

$$\sigma(x, t) = \int_0^t R[\xi(t) - \xi(t')] \frac{\partial \sigma_g(x, t')}{\partial t'} dt'$$

$$\sigma_g(x, t) = [E/(1 - v)][\varepsilon(t) - \varepsilon_{th}(x, t)]$$

$$\varepsilon_{th}(x, t) = \beta_g[T(x, t) - T_0] + \beta_s[T_f(x, t) - T_0]$$

$$\beta_s = \beta_l - \beta_g$$

Here, R represents relaxation of spherical stress, E and v represent the Young's modulus and Poisson ratio of glass, respectively, and $\beta_1$ and $\beta_s$ represent the linear expansion coefficient of glass in a liquid state and the linear expansion coefficient of solidified glass, respectively.

Further, the temperatures in Table 1 are values at the time when the difference between the surface temperature and the center portion temperature became substantially the maximum at the time of applying cooling and radio-frequency heating, and as shown in FIG. 9, the surface temperature and the center portion temperature are the surface temperature and the center portion temperature, respectively, for a glass sheet, when the difference between the surface temperature and the center portion temperature became the maximum. When the surface stress is at least 100 MPa by the compression stress value of the glass sheet surface after completion of tempering, it is judged that a sufficient tempered degree was obtained (represented by "tempered OK" in Table 1).

In the foregoing, embodiments of the present invention have been described in detail with reference to the drawings. However, specific constructions are not limited to such embodiments, and various modifications and changes may be made within a range not departing from the concept of the present invention.

For example, in the above embodiments, cases wherein soda lime silicate glass is used as the glass sheet are shown. If an alkali component such as Na, Li or K is increased in soda lime silicate glass, the dielectric loss increases, whereby it becomes possible to efficiently carry out heating by radio-frequency heating. Not limited to such cases, the present invention can be applied, for example, to a case where a glass sheet containing metal ions is tempered. Metal ions to be contained in the glass sheet may, for example, be preferably $V^{4+}$, $Fe^{2+}$ or $Cu^{2+}$.

In the case of such a glass sheet, the internal heating may be carried out by using the above-described short wavelength infrared light. Here, the short wavelength infrared light in this application is meant for electromagnetic waves which are also called near infrared light and which are close to visible light (red) of from about 0.7 to 2.5 μm, and wavelengths of about 1.2 μm are particularly preferred for the heating of a glass sheet. Metal ions to be contained in the glass sheet may suitably be selected depending upon the wavelength of the short wavelength infrared light. At that time, $V^{4+}$ absorbs a wavelength of 1.1 μm, $Fe^{2+}$ absorbs a wavelength of 1.0 μm, and $Cu^{2+}$ absorbs a wavelength of 0.8 μm.

Further, in the above-described embodiments, at least the surface portion 13b of each conveying roll 13 and nozzle units 50 and 60 are formed of an insulator to electrically insulate them from the electrode units 21, but the construction to suppress electric discharge is not limited to such a construction.

For example, members around the electrode units, such as nozzle units 50, are formed of a conductor, electrical insulation may be carried out by making the shortest distance between the nozzle units 50 and the electrode units 21 longer than the shortest distance between the feed electrode 22 and the passive electrode 28 (i.e. the distance d1 between the electrode surface 22a and the electrode surface 28a shown in FIG. 3). That is, an unnecessary electric discharge can be avoided by making the distance of the electrode from a conductor disposed closest to the electrode, longer than the distance between the electrodes. The longer the shortest distance between an electrode unit and a member around the electrode unit, the less likely the electric discharge. When such a shortest distance is at least three times the distance between the electrodes, it is possible to effectively prevent electric discharge even if the member around the electrode unit may not be made of an insulator. Therefore, in the case of the tempering apparatus 1, this can be done if the component or member made of a conductor is not disposed in a range of a radius being three times the distance d1 from the electrode surface 22a of the feed electrode 22.

Further, in the above-described embodiments, cases of a radio-frequency heating means provided with a feed electrode and a passive electrode as electrodes of a radio-frequency heating means 20, are shown, but the construction of the radio-frequency heating means 20 is not limited thereto, and other constructions for heating means such as known electrodes and power sources, may be employed.

Further, in the above-described embodiments, cases wherein the tempering apparatus 1 is provided with a heating furnace 16. However, the temperature apparatus 1 may not be provided with a pre-heating means such as a heating furnace 16. In such a case, a glass sheet may be heated by a radio-frequency heating means 20, and the same effect as the above-described tempering apparatus 1 may be obtained by carrying out a heating step by such a radio-frequency heating means 20.

Further, in the above-described embodiments, cases have been described in which the surface portion 13b of a conveying roll 13 is made of a material having insulation properties, but the conveying roll is not limited thereto and the entire conveying roll 13 may be formed of a material having insulation properties.

Further, in the above-described embodiments, cases have been described in which as an example of the cooling medium for the quenching means, air discharged by e.g. a blower, is used, but cooling may be carried out by using compressed air having the pressure increased. Further, the cooling medium is not limited to air. That is, as the cooling means 40, a known cooling means may be applied, and for example, the cooling medium may be a fluid, i.e. a liquid, a gas or a mixture of a liquid and a gas, may, for example, be suitably employed. Further, also the composition of the cooling medium is not particularly limited, and other than air, nitrogen or carbon dioxide may, for example, be used.

Further, the quenching means may also be used as a cooling means to carry out usual cooling or annealing to remove heat slowly by adjusting the cooling power to be small.

Further, in the above-described embodiments, cases have been described wherein a glass sheet is tempered in the form of a flat sheet without being subjected to e.g. bending treatment, but the tempering method of the present invention is not limited thereto, and may be provided, for example, with a forming step of applying e.g. bending treatment to a glass sheet prior to tempering the glass sheet.

In such a case, the forming step may be a step of heating the glass sheet to a temperature close to the softening point of the glass sheet to soften the glass sheet, abutting this glass sheet against a forming die having a predetermined shape to press the shape of the forming die on the glass sheet, and cooling the pressed glass sheet to a temperature of at most the softening point and at least the annealing point. It is thereby possible to apply the method for tempering a glass sheet of the present invention not only to a flat glass sheet but also to a safety glass sheet for vehicles having a curved shape. It is thereby possible to provide a desired safety glass sheet for vehicles efficiently with less energy.

Further, according to the present invention, it is possible to increase the temperature difference between the surfaces and the center portion of a glass sheet, whereby it becomes possible to suitably temper a glass sheet having a thin thickness, and a tempered glass thus obtained can suitably be used as a safety glass for vehicle windows. For example, according to the tempering method and the tempering apparatus of the present invention, it is possible to efficiently temper a glass sheet having a thickness of at most 2.8 mm. When the thickness of a glass sheet tempered by the present invention is up to 2.5 mm, such a glass sheet can easily be processed by a conventional forming method, whereby application to an existing production installation is easy, and production of a tempered glass sheet having a thin thickness can be efficiently carried out, and in the case of a glass sheet having a thickness of at least 2.8 mm, the applicability to an existing production installation becomes even higher.

Further, by the present invention, production of a tempered glass sheet of at most 2.5 mm or at most 2.0 mm becomes possible, whereby production of a safety glass sheet for vehicle windows having a thin thickness, of which the production used to be difficult because of difficulty in creating the temperature difference between the center portion and the surfaces of a glass sheet required for tempering, can be realized. As a result, the present invention contributes to reduction of the weight of a vehicle such as an automobile and thus to reduction of a fuel cost.

Further, by reducing the thickness of the glass sheet, the raw material required for the production of the glass sheet can be reduced, whereby it is possible to save energy required for the production of the glass sheet and to provide an environmental-friendly tempered glass sheet.

Further, the present invention is not limited to a safety glass sheet for vehicle windows, and when it is applied to the fields of buildings, constructions, displays, etc., it is possible to provide thinner tempered glass than ever or a less breakable glass sheet.

REFERENCE SYMBOLS

1: Apparatus for tempering glass sheet
5: Air (cooling medium)
10: Conveying means
13: Conveying roll (support member)
15: Heating means
21: Electrode unit
22: Feed electrode
24a: Power feeding portion
28: Passive electrode
29: Electrode wiring
35: Power source
40: Quenching means
43: Chamber unit (discharge means)
50, 60: Nozzle unit
51, 61: Nozzle
51a, 61a: Opening
G: Glass sheet
Ga: Surface
Gb: Center portion

What is claimed is:

1. A method for tempering a glass sheet, comprising:
a heating step of preheating the glass sheet to a temperature close to the softening point of the glass sheet;
a quenching step of blowing a cooling medium to both surfaces in the thickness direction of the heated glass sheet;
a pre-quenching step performed between the heating step and the quenching step when a vicinity of a center portion in the thickness direction of the glass sheet has a temperature different from surfaces of the glass sheet; and
an internal heating substep of selectively heating the vicinity of the center portion in the thickness direction of the glass sheet, relative to the surfaces, at least in the quenching step, wherein initiation of the internal heating substep is set to be within a period from an intermediate time point in the pre-quenching step to an intermediate time point in the quenching step, and termination of the internal heating substep is set to be at an intermediate time point in the quenching step, such that in the quenching step, when the temperature in the vicinity of the center portion in the thickness direction of the glass sheet is close to the tempering point of the glass sheet, the temperature at the surfaces in the thickness direction of the glass sheet is not higher than the annealing point.

2. The method for tempering a glass sheet according to claim 1, wherein when the temperature in the vicinity of the center portion in the thickness direction of the glass sheet is close to the tempering point, the difference between the temperature in the vicinity of the center portion in the thickness direction of the glass sheet and the temperature at the surfaces is at least 100° C.

3. The method for tempering a glass sheet according to claim 1, wherein when the temperature in the vicinity of the center portion in the thickness direction of the glass sheet is close to the tempering point, the temperature at the surfaces in the thickness direction of the glass sheet is at most the strain point minus 20° C.

4. The method for tempering a glass sheet according to claim 1, wherein in the internal heating substep, the temperature in the vicinity of the center portion in the thickness direction of the glass sheet at the time of initiation of the internal heating substep is the highest temperature of the glass sheet in the internal heating substep.

5. The method for tempering a glass sheet according to claim 1, wherein the glass sheet is made of soda lime silicate glass, and the internal heating substep comprises applying radio frequency radiation to the glass sheet to heat the glass sheet by radio frequency heating.

6. The method for tempering a glass sheet according to claim 1, wherein the glass sheet is a glass sheet containing metal ions, and in the internal heating substep, the glass sheet is heated by means of short wavelength infrared light.

7. A method for tempering a glass sheet, comprising:
a heating step of preheating the glass sheet to a temperature close to the softening point of the glass sheet;
a quenching step of blowing a cooling medium to both surfaces in the thickness direction of the heated glass sheet;
a pre-quenching step performed between the heating step and the quenching step when a vicinity of a center portion in the thickness direction of the glass sheet has a temperature different from surfaces of the glass sheet; and
an internal heating substep of selectively heating the vicinity of the center portion in the thickness direction of the glass sheet, relative to the surfaces, at least in the quenching step, wherein in or subsequent to the pre-quenching step, when the temperature at the center portion in the thickness direction of the glass sheet is designated as $x°$ C., and the temperature at either one of both surfaces in the thickness direction of the glass sheet is designated as $y°$ C., and when the temperature at the center portion in the thickness direction of the glass sheet is at least 620° C. and at most 700° C., x and y are in a relation to satisfy a primary expression of $y=ax+b$ (where a and b are constants), and the constant a in the primary expression is at least 0.5 and at most 0.65, and the constant b in the primary expression is at least 60 and at most 180.

8. The method for tempering a glass sheet according to claim 7, wherein the glass sheet is a glass sheet containing metal ions, and in the internal heating substep, the glass sheet is heated by means of short wavelength infrared light.

9. The method for tempering a glass sheet according to claim 7, wherein the glass sheet is made of soda lime silicate glass, and the internal heating substep comprises applying radio frequency radiation to the glass sheet to heat the glass sheet by radio frequency heating.

* * * * *